(12) United States Patent
Hembach et al.

(10) Patent No.: US 11,996,762 B2
(45) Date of Patent: May 28, 2024

(54) STARTING CIRCUIT, ACTUATION CIRCUIT, AND METHOD FOR SUPPLYING A VOLTAGE TO A CONTROLLER

(71) Applicant: Robert Bosch GmbH, Stuttgart (DE)

(72) Inventors: Florian Hembach, Vienna (AT); Lukas Burgstaller, Vienna (AT); Anna Shatura, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 280 days.

(21) Appl. No.: 17/606,911

(22) PCT Filed: Apr. 29, 2020

(86) PCT No.: PCT/EP2020/061904
§ 371 (c)(1),
(2) Date: Oct. 27, 2021

(87) PCT Pub. No.: WO2020/225057
PCT Pub. Date: Nov. 12, 2020

(65) Prior Publication Data
US 2022/0209644 A1  Jun. 30, 2022

(30) Foreign Application Priority Data
May 9, 2019 (DE) ............ 10 2019 206 692.5

(51) Int. Cl.
*H02M 1/08* (2006.01)
*H02M 1/00* (2006.01)
(Continued)

(52) U.S. Cl.
CPC ............... *H02M 1/08* (2013.01); *H02M 1/00* (2013.01); *H02M 1/0006* (2021.05); *H02M 1/36* (2013.01); *H02M 3/33507* (2013.01)

(58) Field of Classification Search
CPC .. H02M 3/1582; H02M 3/1584; H02M 3/285; H02M 3/33561; H02M 7/49;
(Continued)

(56) References Cited

U.S. PATENT DOCUMENTS 5,350,992 A * 9/1994 Colter ............... H02P 1/44
318/807
7,750,504 B2 * 7/2010 Lee ............... G06F 1/26
307/43

(Continued)

FOREIGN PATENT DOCUMENTS

EP  1531543 A2  5/2005

OTHER PUBLICATIONS

Translation of International Search Report for Application No. PCT/EP2020/061904 dated Jul. 29, 2020 (2 pages).

*Primary Examiner* — Kevin J Comber
*Assistant Examiner* — Nusrat Quddus
(74) *Attorney, Agent, or Firm* — Michael Best & Friedrich LLP

(57) ABSTRACT

The invention relates to a voltage supply for a controller of a converter. In particular, a reliable and stable voltage supply for controlling the converter is facilitated, said voltage supply allowing a stable operation, wherein a changeover is allowed between a self-sufficient voltage supply by the inverter itself and a redundant voltage supply by means of an external source.

8 Claims, 4 Drawing Sheets

(51) Int. Cl.
*H02M 1/36* (2007.01)
*H02M 3/335* (2006.01)

(58) Field of Classification Search
CPC ........ H02M 1/045; H02M 7/006; H02M 7/06;
H02M 7/068; H02M 7/153; H02M 7/10;
H02M 1/088; H02M 7/103; H02M 7/106;
H02M 7/19; H02M 7/08; H02M 7/17;
H02M 2001/007; H02M 7/493; H02M
7/53806; H02M 7/5381; H02M 7/483;
H02M 7/217; H02M 7/538466; H02M
7/5387; H02M 7/53871; H02M 7/53873;
H02M 7/53875; H02M 1/084; H02M
1/0845; H02M 5/40; H02M 5/42; H02M
5/453; H02M 7/7575; H02M 5/458;
H02M 5/45; H02M 5/4585; H02M
5/4505; H02M 5/451; H02M 5/452;
H02M 5/447; H02M 5/456; H02M 1/12;
H02M 1/4266; H02M 2001/123; H02M
3/073; H02M 3/10; H02M 3/135; H02M
3/137; H02M 3/28; H02M 3/315; H02M
3/3155; H02M 3/325; H02M 3/335;
H02M 7/515; H02M 7/521; H02M 7/53;
H02M 7/537; H02M 7/5383; H02M
7/53862; H02M 7/757; H02M 7/79;
H02M 3/337; H02M 3/338; H02M
3/3382; H02M 3/3384; H02M 7/538;
H02M 7/53832; H02M 7/53835; H02M
7/487; H02M 7/539; H02M 7/23; H02M
7/21; H02M 7/12; H02M 7/04; H02M
7/00; H02J 3/46; H02J 3/38; H02J 3/36;
H02J 3/01; H02H 7/261; H02H 7/268
See application file for complete search history.

(56) References Cited

U.S. PATENT DOCUMENTS

| | | | |
|---|---|---|---|
| 8,680,776 B1* | 3/2014 | Mays | H02M 1/4225 |
| | | | 315/307 |
| 9,471,120 B1* | 10/2016 | Thakur | G06F 1/24 |
| 2007/0058398 A1 | 3/2007 | Yang et al. | |
| 2011/0305051 A1 | 12/2011 | Yang et al. | |
| 2019/0115837 A1* | 4/2019 | Fahlenkamp | H02M 3/33507 |
| 2023/0024118 A1* | 1/2023 | De Vos | H02J 7/345 |
| 2023/0275537 A1* | 8/2023 | Cameron | H02J 7/342 |
| | | | 307/9.1 |

* cited by examiner

STARTING CIRCUIT, ACTUATION CIRCUIT, AND METHOD FOR SUPPLYING A VOLTAGE TO A CONTROLLER

BACKGROUND OF THE INVENTION

The present invention relates to a starting circuit for a voltage supply of a controller, in particular a controller for an electrical power converter. The present invention also relates to an actuation circuit for an electrical power converter and to a method for supplying voltage to a controller, in particular a controller for an electrical power converter.

Electrical power converters, for example inverters, are used in numerous fields of application. For example, electrical power converters are used to generate, from an electrical DC voltage in an electric vehicle, a voltage which actuates the electric motors of the electric vehicle. For this purpose, the switching elements of such a power converter must be actuated in a targeted manner. The control signals for this are generated by means of a controller and are provided at the respective switching elements.

The document EP 1531543 A2 discloses a method for supplying power to a multi-phase, electrically commutatable electric motor controlled by means of pulse width modulation from a DC voltage network.

Redundant voltage generation may be provided or even required for the voltage supply of the controller of a power converter. For example, on the one hand, the voltage supply may be achieved directly via the components of the inverter using the control circuit. In addition, a redundant voltage supply may be achieved, for example by means of a high-voltage flyback circuit or the like.

A safe voltage supply of the controller for the power converter is desirable for reliable operation of a power converter.

SUMMARY OF THE INVENTION

The present invention provides a starting circuit for a voltage supply of a controller, in particular a controller for an electrical power converter, and a method for supplying voltage to a controller having the features of the independent patent claims. The dependent patent claims relate to further advantageous embodiments.

The following is accordingly provided:

A starting circuit for a voltage supply of a controller, in particular a controller for an electrical power converter. The starting circuit comprises a first input connection and a second input connection. The first input connection is designed to be coupled to an electrical energy source. The second input connection is designed to be coupled to an output connection of the voltage supply for the controller. The starting circuit is designed, in a first operating mode, to generate an electrical voltage for supplying the controller from a first electrical voltage provided at the first input connection by the electrical energy source. The starting circuit is also designed to provide the generated voltage at the controller. The first electrical voltage is generated and provided at the controller, in particular, when an electrical voltage at the second input connection undershoots a predefined first threshold value. The starting circuit is also designed, in a second operating mode, to provide a second electrical voltage provided at the second input connection at the controller. The second electrical voltage is provided at the controller, in particular, when the electrical voltage at the second input connection exceeds a predefined second threshold value. The starting circuit is also designed, in the first or second operating mode, to output a control signal for activating the voltage supply of the controller if an electrical voltage at the first input connection exceeds a predefined third threshold value. The starting circuit is also designed, in a third operating mode, to output a control signal for deactivating the voltage supply of the controller if the electrical voltage at the first input connection undershoots the predefined third threshold value.

The following is also provided:

An actuation circuit for an electrical power converter, having a controller, a voltage supply circuit and a starting circuit according to the invention. The controller is designed to generate actuation signals for the electrical power converter and to provide said actuation signals at the power converter. The voltage supply circuit is designed to provide an electrical voltage for supplying energy to the controller. In particular, the voltage supply circuit may be designed to provide an electrical voltage for supplying energy to the controller using an electrical voltage from the power converter.

The following is finally provided:

A method for supplying voltage to a controller, in particular a controller for an electrical power converter. The method comprises a step for generating an electrical voltage for supplying the controller from a first electrical voltage provided at a first input connection by an electrical energy source in a first operating mode, and providing the generated electrical voltage at the controller if an electrical voltage at a second input connection, which is coupled to the voltage supply of the controller, undershoots a predefined first threshold value. The method also comprises a step for providing a second electrical voltage present at the second input connection at the controller in a second operating mode if the electrical voltage at the second input connection exceeds a predefined second threshold value. The method also comprises a step for activating a voltage supply of the controller in the first or second operating mode if an electrical voltage at the first input connection exceeds a predefined third threshold value. Finally, the method comprises a step for deactivating the voltage supply of the controller in a third operating mode if the electrical voltage at the first input connection undershoots the predefined third threshold value.

The present invention enables a safe and reliable voltage supply of a controller for an electrical power converter. In particular, a stable operating behavior can be achieved in each case by flexibly setting the voltage thresholds for changing to the first and/or second operating mode. For example, a frequent change between the operating states on account of minor interference or short-term voltage changes can be prevented by suitably setting the threshold values. Furthermore, the flexible configuration of the switching thresholds also makes it possible to reliably configure the operating points, with the result that dangerous operating states, which can result in overheating or the like for example, can be reliably prevented.

In addition, the change between the individual operating states on the basis of the predefined switching thresholds is carried out by virtue of a state change inside the starting circuit. In this manner, the starting circuit is independent of external actuation signals, in particular independent of software components of external assemblies.

According to one embodiment, the first switching threshold, upon the undershooting of which the starting circuit changes to the first operating mode, is greater than the second switching threshold, upon the exceeding of which the starting circuit changes to the second operating mode.

This makes it possible to define a hysteresis by virtue of the difference between the two switching thresholds. Such a hysteresis prevents a premature change between the individual operating modes on account of minor interference or short-term input voltage changes. This enables stable and reliable operation.

According to one embodiment, the starting circuit comprises a step-down circuit. The step-down circuit is designed to convert a first electrical voltage from the first input connection into an electrical voltage with a predetermined voltage level. The converted voltage can be provided at the controller. In particular, the converted voltage can be provided as the voltage supply of the controller. Such a step-down circuit or another DC/DC converter can be used in this manner to convert any desired external DC voltage into a DC voltage which can guarantee the voltage supply of the power converter while starting or starting up the controller for the power converter.

According to one embodiment, the first input connection is designed to be coupled to a high-voltage battery, in particular a high-voltage battery of an electric vehicle. In this manner, the voltage supply for the control circuit of the power converter can be provided by the high-voltage battery as long as the power converter itself is not yet able to itself provide the voltage supply.

In one embodiment, the second electrical voltage, that is to say the electrical voltage provided at the output connection of the voltage supply of the controller, may be generated from an electrical voltage of the power converter. For example, the inverter, in particular the controller of the inverter, may comprise a voltage supply circuit for this purpose. For example, the voltage supply circuit may be a circuit, in particular an integrated circuit, which generates a suitable voltage for supplying voltage to the controller from a voltage available in the inverter.

The above configurations and developments can be combined with one another in any desired manner if useful. Further configurations, developments and implementations of the invention also comprise combinations—not explicitly mentioned—of features of the invention described above or below with respect to the exemplary embodiments. In particular, a person skilled in the art will also add individual aspects as improvements or additions to the respective basic forms of the invention.

BRIEF DESCRIPTION OF THE DRAWINGS

Further features and advantages of the present invention are explained below on the basis of the figures, in which.

DETAILED DESCRIPTION

Figure 1:
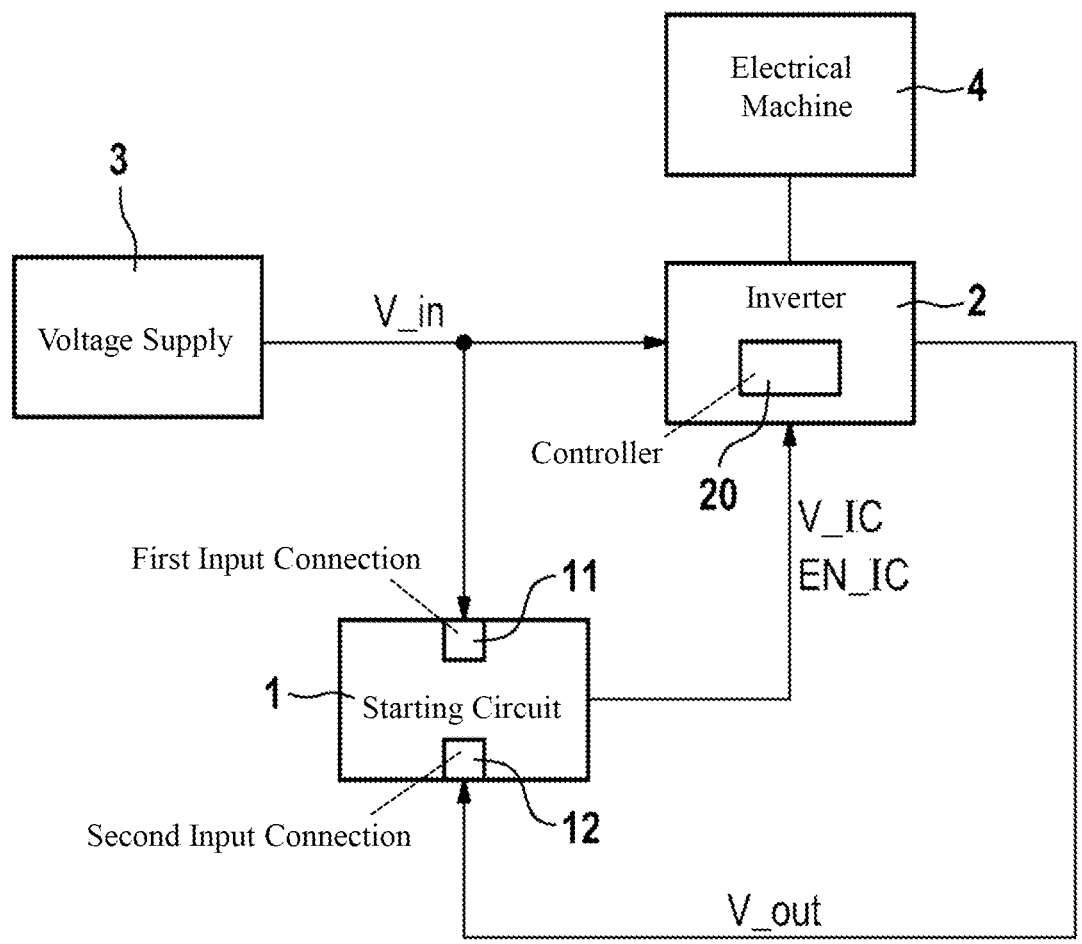
FIG. 1: shows a schematic illustration of a block diagram of an electrical drive system having a power converter and a starting circuit according to one embodiment.

FIG. 1 shows a block diagram of an electrical drive system having a starting circuit 1 for a voltage supply of a controller for an electrical power converter 2 according to one embodiment. The electrical drive system comprises an electrical machine 4, a voltage supply 3, for example a high-voltage battery or another DC voltage source, an inverter 2 and a starting circuit 1. The DC voltage source 3 provides a DC voltage at the one inverter 2. This DC voltage is converted by the inverter 2 into an electrical AC voltage which is suitable for actuating the electrical machine 4 according to external setpoint value specifications (not illustrated here). For this purpose, a plurality of switching elements, for example semiconductor switching elements, of the inverter 2 can be actuated using appropriate control signals. In order to generate the control signals, the inverter 2 comprises a controller 20 which provides the appropriate control signals. This controller 20 requires a suitable voltage supply. During operation of the inverter 2, the voltage supply required for this purpose can be generated by an electrical voltage itself available in the inverter 2. For example, such a supply voltage V_out can be generated inside the inverter 2. For example, the supply voltage can be generated by means of a suitable circuit, for example an integrated circuit such as a control IC or the like, for example.

During operation of the inverter 2, there are possibly operating states, for example when starting the system, in particular when starting the inverter and the control circuit 20, in which this control IC cannot yet be independently supplied with voltage. In this case, an additional, external voltage supply is required. This external voltage supply and the process of changing over between the internal and external voltage supply can be implemented, for example, by means of a starting circuit 1. The functional principle of this starting circuit 1 is explained in more detail below.

An external voltage supply, for example a voltage supply from the DC voltage source 3, can be provided at a first input connection 11 of the starting circuit 1. While starting up or starting the inverter 2, the starting circuit 1 can generate the required voltage supply for the inverter 2, in particular the control circuit 20, from the voltage provided by the DC voltage source 3. After the inverter 2 can maintain an independent voltage supply, the voltage V_out generated by the inverter 2 can take over the voltage supply. For this purpose, the voltage V_out generated by the inverter 2 is provided at a second input connection 12 of the starting circuit 1. The starting circuit 1 compares the electrical voltage V_out of the inverter 2, which is provided at the second input connection 12, with predefined threshold values and controls the voltage supply V_IC of the inverter 2, in particular of the controller 20 for the inverter 2, using these threshold values. For this purpose, either the voltage V_out provided by the inverter 2 can be made available to the inverter as the voltage supply V_IC or alternatively the starting circuit can provide the voltage at the inverter 2, which voltage was generated from the DC voltage provided at the first input connection 11 by the DC voltage source 3. The starting circuit 1 therefore provides, at the inverter 2, a voltage supply V_IC which makes it possible for the inverter 2 to supply the internal voltage control, for example the control IC, with voltage in order to maintain the internal voltage supply.

In addition, the starting circuit 1 may provide, at the inverter, a further signal EN_IC which activates or deactivates the internal voltage supply circuit of the inverter 2. For example, the internal voltage supply can be activated by the activation signal EN_IC if the starting circuit 1 provides a stable voltage V_IC either on the basis of the voltage from the DC voltage source 3 or the voltage V_out provided by the inverter 2. Otherwise, if a stable voltage for supplying voltage to the voltage supply circuit is not provided in the inverter 2, the control signal EN_IC can deactivate the voltage supply circuit in the inverter 2.

Figure 2:
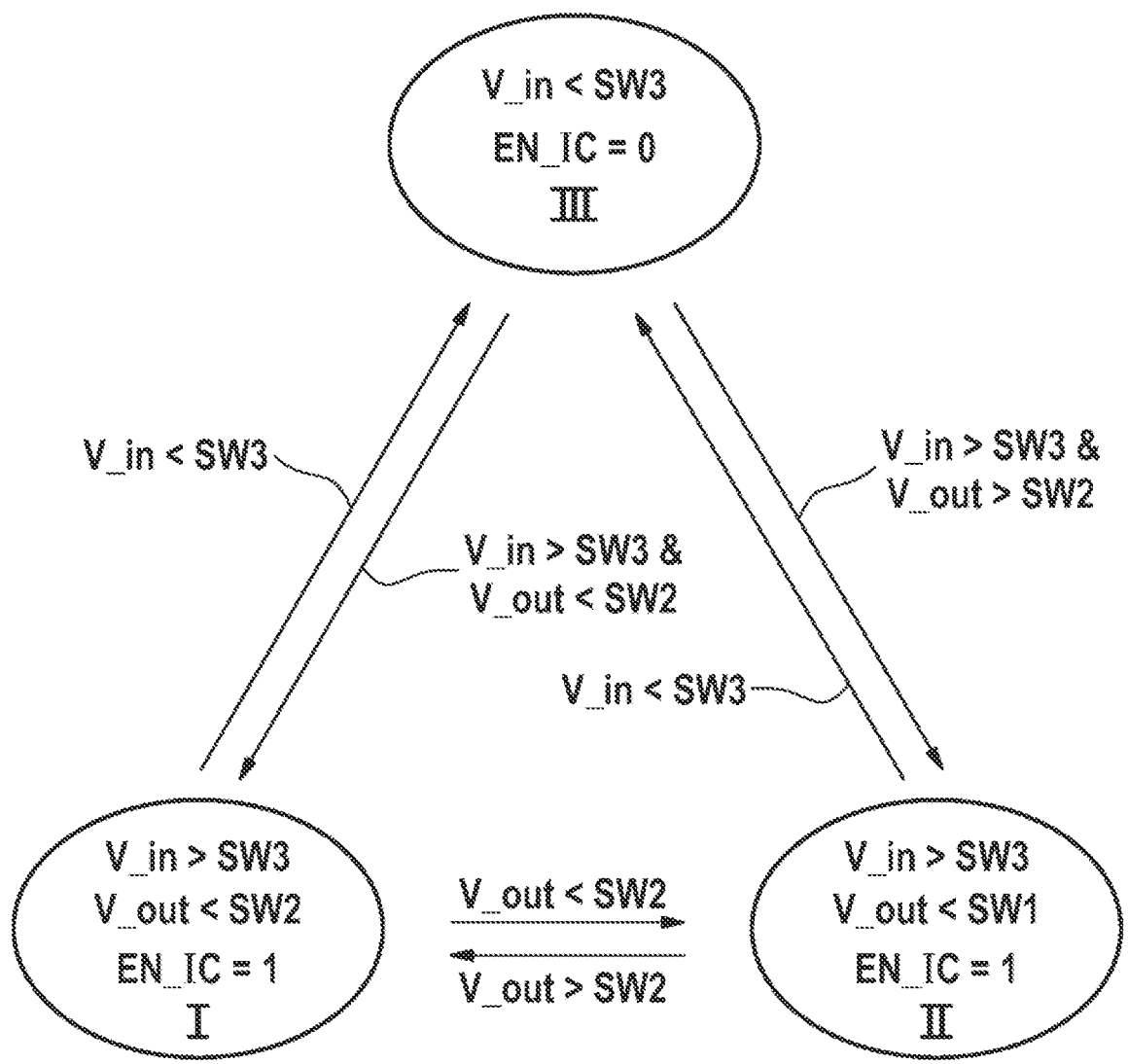
FIG. 2: shows a schematic illustration of a state diagram, on which a starting circuit according to one embodiment is based.

FIG. 2 shows a schematic illustration of a state diagram for the operating modes of the starting circuit 1 according to one embodiment. In a first operating mode I during starting, a sufficiently high DC voltage can be provided at the starting circuit 1 by the DC voltage source 3. However, since the inverter 2 itself is not yet active, the output voltage V_out provided by the inverter 2 undershoots a predefined first threshold value SW1. In this first operating state, the starting circuit 1 will therefore generate a voltage V_IC at the inverter 2 using the DC voltage provided by the DC voltage source 3 and will provide it at the inverter 2. In the case of an electrical drive system for an electric vehicle, a voltage V_IC for the inverter of a level of approximately 13 V can be generated from the voltage of a high-voltage battery 3, for example. In addition, the voltage supply circuit of the inverter 2 is activated by appropriately signaling the activation signal EN_IC.

After the voltage supply circuit of the inverter 2 can guarantee a stable voltage supply by means of an electrical voltage inside the inverter 2 and the output voltage V_out at the inverter 2 then exceeds a predefined second threshold value SW2, the starting circuit 1 changes to a second operating mode II. In this second operating mode II, the voltage supply circuit inside the inverter 2 is supplied by the starting circuit 1 from the output voltage V_out of the inverter 2. In addition, the voltage supply circuit is activated by appropriately signaling the activation signal EN_IC. In this case, it is no longer necessary for the starting circuit 1 to provide the voltage supply of the inverter using the DC voltage from the DC voltage source 3.

In order to prevent a fast change between the first and second operating states I and II in the event of slight interference or voltage fluctuations, the second switching threshold SW2 can be set to be higher than the first switching threshold SW1.

If the electrical DC voltage provided by the DC voltage source 3, for example the voltage provided by a high-voltage battery of an electric vehicle, is below a predefined third threshold value SW3, for example because the high-voltage battery 3 has been disconnected from the other components of the electrical drive system, the starting circuit changes to a third operating state, for example an idle state. In this case, the voltage supply circuit, for example the control IC, of the inverter 2 is deactivated. Furthermore, the output voltage V_out provided by the inverter 2 may possibly be provided as the voltage supply at the inverter 2, in particular the control circuit of the inverter 2.

Figure 3:
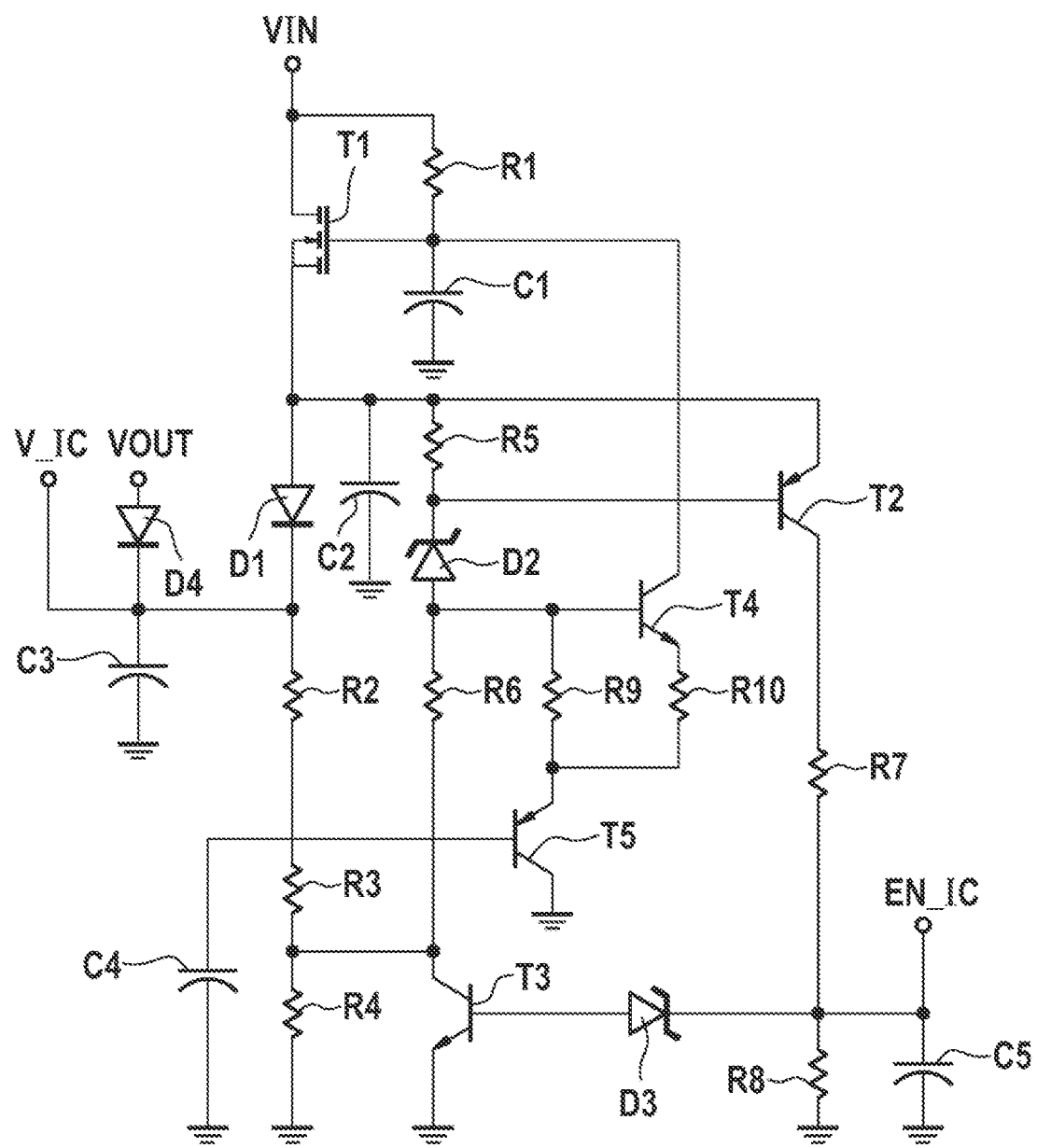
FIG. 3: shows a schematic illustration of a basic circuit diagram, on which a starting circuit according to one embodiment is based.

FIG. 3 shows a schematic illustration of a basic circuit diagram, on which a starting circuit 1 for the voltage supply of a controller of a power converter may be based. In order to avoid unduly expanding the description, reference is made to the corresponding FIG. 3 for the specific circuit structure, and only some relevant components or circuit groups are explained in more detail below. The electrical voltage V_IC for supplying the voltage supply circuit of the inverter 2, for example for a suitable control IC or the like, may be generated from the DC voltage V_in from the DC voltage source 3 by way of the semiconductor switch T1 and the diode D1. In this case, the level of the output voltage V_IC during the first operating mode can be set using R1, for example. Alternatively, if there is a sufficiently high voltage of the output voltage V_out from the inverter 2, the voltage V_IC for the voltage supply circuit of the inverter 2 can be provided via the diode D4.

After the rise in the voltage V_in from the DC voltage source 3, the transistor T1 initially begins to conduct. Directly after this, the voltage across the resistor R4 begins to rise. In this case, the activation threshold may be set using the chains R2-R3-R4 and R5-R6-D2. After the activation threshold has been exceeded, T2 begins to conduct, as a result of which the activation signal EN_IC is activated. In this case, the voltage is restricted by the diode D3 and the base-emitter voltage of T3. After the transistor T3 has turned on, the hysteresis is canceled on account of the voltage drop across R4. At the same time, the branch T4-R9-R10-T5 is activated.

During switch-off, the voltage V_in of the DC voltage source falls below the Zener voltage of the diode D2, for example as a result of the high-voltage battery being disconnected from the electrical drive system, and the base current of T2 therefore falls below the switching condition. Therefore, the circuit returns to the starting state after the required base current of T2 has been undershot.

In the case of an electrical drive system for an electric vehicle, the DC voltage source 3, for example, may comprise a high-voltage battery of an electric vehicle and may therefore be at a level of 300 to 400 V and possibly even higher, for example 800 V or more. The first threshold value SW1 for the change to the second operating state II may be at a level of approximately 14 V, for example. The second threshold value SW2 for the change to the first operating state may be at a level of approximately 13 V, for example. Furthermore, the electrical voltage which is generated by the starting circuit for the voltage supply of the inverter 2 in the first operating state may also be at a level of approximately 13 V. It goes without saying that other threshold values or voltage levels are also possible, depending on the application.

Figure 4:
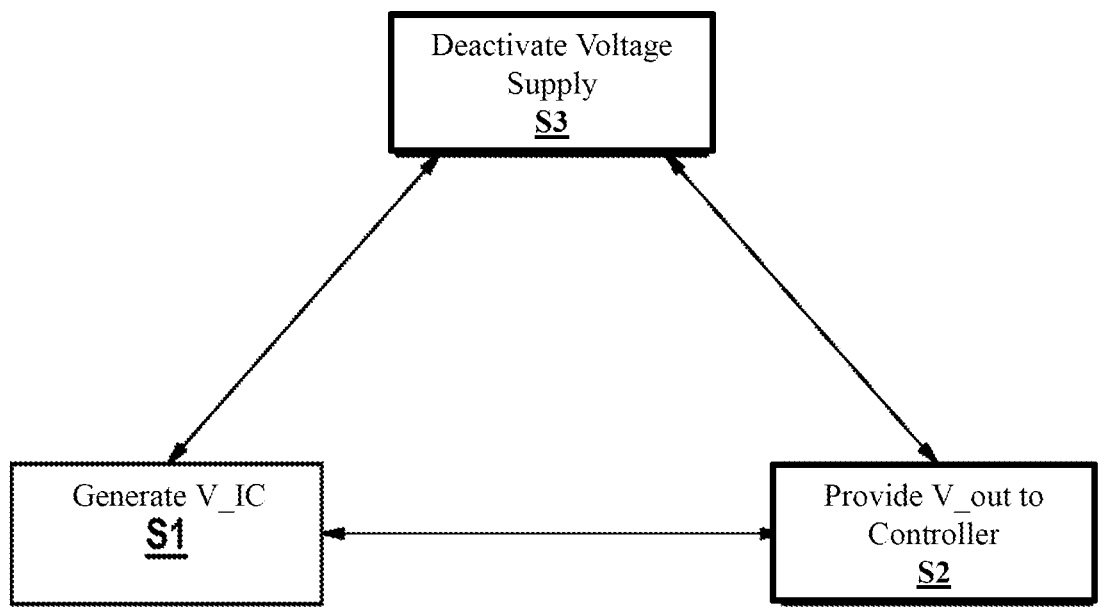
FIG. 4: shows a flowchart, on which a method for supplying voltage according to one embodiment is based.

FIG. 4 shows a schematic illustration of a flowchart, on which a method for supplying voltage to a controller, in particular a controller for a power converter, is based. In step S1, an electrical voltage V_IC for supplying the controller is generated. The electrical voltage may be generated, in particular, from an electrical voltage provided at a first input connection 11 by an electrical energy source 2. The generated electrical voltage may be provided at the controller 20 for the electrical power converter 2. In particular, step S1 can be carried out in a first operating mode if an electrical voltage at a second input connection 12 undershoots a predefined first threshold value SW1. The second input connection 12 can be coupled to the voltage supply V_out of the controller 20.

In a second operating mode, in step S2, a second electrical voltage V_out present at the second input connection 12 can be provided at the controller 20. In particular, the second electrical voltage V_out is provided in the second operating mode if the electrical voltage V_out at the second input connection 12 exceeds a predefined second threshold value SW2. In this case, the second threshold value SW2 may be greater than the first threshold value SW1. In particular, the difference between the second threshold value SW2 and the first threshold value SW1 may comprise a predefined hysteresis.

Furthermore a voltage supply of the controller 20 can be activated both in the first operating mode and in the second operating mode if an electrical voltage V_in at the first input connection 11 exceeds a predefined third threshold value SW3.

In a third step S3, the voltage supply of the controller 20 can be deactivated in a third operating mode if the electrical voltage V_in at the first input connection 11 undershoots the predefined third threshold value SW3.

In summary, the present invention relates to a voltage supply for a controller of a power converter. In particular, a reliable and stable voltage supply for controlling the power converter is enabled, which voltage supply enables stable operation, during which it is possible to change between an autonomous voltage supply by the inverter itself and a redundant voltage supply by an external source.

The invention claimed is:

1. A starting circuit for a voltage supply of a controller of an electrical power converter, having:
    a first input connection configured to be coupled to an electrical energy source; and
    a second input connection configured to be coupled to an output connection of the controller;
    wherein the starting circuit is configured to operate in a first operating mode, a second operating mode, and a third operating mode, wherein
    in the first operating mode, the starting circuit is configured to generate an electrical voltage for supplying the controller from a first electrical voltage provided at the first input connection by the electrical energy source and to provide said voltage at the controller if an electrical voltage at the second input connection undershoots a predefined first threshold value,
    in the second operating mode, the starting circuit is configured to provide a second electrical voltage provided at the second input connection at the controller if the electrical voltage at the second input connection exceeds a predefined second threshold value,
    in the first or the second operating mode, the starting circuit is configured to output a control signal for activating the voltage supply of the controller if an electrical voltage at the first input connection exceeds a predefined third threshold value, and
    in the third operating mode, the starting circuit is configured to output a control signal for deactivating the voltage supply of the controller if the electrical voltage at the first input connection undershoots the predefined third threshold value.

2. The starting circuit as claimed in claim 1, wherein the first threshold value is greater than the second threshold value.

3. The starting circuit as claimed in claim 1, wherein the starting circuit comprises a step-down circuit configured to convert the first electrical voltage at the first input connection into an electrical voltage with a predetermined voltage level and to provide said voltage at the controller.

4. The starting circuit as claimed in claim 1, wherein the first input connection is configured to be coupled to a high-voltage battery of an electric vehicle.

5. An actuation circuit for an electrical power converter comprising:
    the controller configured to generate actuation signals for the electrical power converter and to provide said actuation signals at the power converter;
    a voltage supply circuit configured to provide an electrical voltage for supplying energy to the controller; and
    the starting circuit as claimed in claim 1.

6. The actuation circuit as claimed in claim 5, wherein the voltage supply circuit is configured to generate the electrical voltage for supplying energy to the controller from an electrical voltage of the electrical power converter.

7. A method for supplying voltage to a controller for an electrical power converter comprising:
    generating an electrical voltage for supplying the controller from a first electrical voltage provided at a first input connection by the electrical energy source in a first operating mode, and providing the generated electrical voltage at the controller if an electrical voltage at a second input connection undershoots a predefined first threshold value, wherein the second input connection is coupled to the controller;
    providing a second electrical voltage present at the second input connection at the controller in a second operating mode if the electrical voltage at the second input connection exceeds a predefined second threshold value,
    activating a voltage supply of the controller in the first or second operating mode if an electrical voltage at the first input connection exceeds a predefined third threshold value, and
    deactivating the voltage supply of the controller in a third operating mode if the electrical voltage at the first input connection undershoots the predefined third threshold value.

8. The method as claimed in claim 7, wherein the second threshold value is greater than the first threshold value.

* * * * *